United States Patent
Yoo et al.

(10) Patent No.: US 11,577,468 B2
(45) Date of Patent: Feb. 14, 2023

(54) 3-D PRINTING APPARATUS FOR FABRICATING SUPERCAPACITOR OR SECONDARY BATTERY

(71) Applicant: KOREA INSTITUTE OF ENERGY RESEARCH, Daejeon (KR)

(72) Inventors: Jung Joon Yoo, Daejeon (KR); Jeong Hun Baek, Daejeon (KR); Yong Il Kim, Daejeon (KR); Ha Na Yoon, Daejeon (KR); Bo Yun Jang, Daejeon (KR); Jong Huy Kim, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 254 days.

(21) Appl. No.: 16/839,497

(22) Filed: Apr. 3, 2020

(65) Prior Publication Data
US 2021/0308949 A1   Oct. 7, 2021

(51) Int. Cl.
*B29C 64/393* (2017.01)
*B29C 64/112* (2017.01)
(Continued)

(52) U.S. Cl.
CPC .......... *B29C 64/393* (2017.08); *B29C 64/112* (2017.08); *B29C 64/209* (2017.08);
(Continued)

(58) Field of Classification Search
CPC ... B29C 64/393; B29C 64/112; B29C 64/232; B29C 64/209; B29C 64/236;
(Continued)

(56) References Cited

U.S. PATENT DOCUMENTS

| 10,254,499 | B1* | 4/2019 | Cohen | B23K 1/20 |
| 2013/0280579 | A1* | 10/2013 | Wright | H01M 10/058 429/188 |
| 2016/0126558 | A1* | 5/2016 | Lewis | H01M 10/0525 264/447 |

(Continued)

FOREIGN PATENT DOCUMENTS

| KR | 10-1148126 B1 | 5/2012 |
| KR | 10-1582768 B1 | 1/2016 |

OTHER PUBLICATIONS

MUSASHI Engineering ML-808 FX COM-CE (https://www.douyee.com/en/products/item/626/MUSASHI-Engineering-ml-808-fx-com-ce; unknown posting date, last accessed Feb. 11, 2022). The Examiner notes because Wright made reference to the Musashi dispenser, it is at least as old as 2013. (Year: 2013).*

*Primary Examiner* — Joseph S Del Sole
*Assistant Examiner* — Lawrence D. Hohenbrink, Jr.
(74) *Attorney, Agent, or Firm* — Birch, Stewart, Kolasch & Birch, LLP

(57) ABSTRACT

Disclosed is a 3-D printing apparatus. The apparatus includes an ink output module including an ink supply unit having an ink for forming an electrode portion, electrolyte or packaging portion received therein and an ink discharge unit coupled to the ink supply unit; a driving unit having the ink output module mounted thereon to move the ink output module in an X, Y, Z axis direction with respect to a substrate where a supercapacitor or secondary battery will be formed; a dispenser connected to the ink supply unit to supply gas having controlled pressure to the ink supply unit through a gas supply tube and to supply the ink within the ink supply unit through the ink discharge unit; and a controller controlling the output of the ink by transmitting a control command for fabricating the supercapacitor or the secondary battery to the dispenser and the driving unit.

17 Claims, 6 Drawing Sheets

(51) Int. Cl.
*B33Y 30/00* (2015.01)
*B29C 64/232* (2017.01)
*B29C 64/236* (2017.01)
*B29C 64/209* (2017.01)
*B33Y 50/02* (2015.01)
*B29L 31/34* (2006.01)
*H01G 11/84* (2013.01)
*B29C 64/106* (2017.01)
*B33Y 10/00* (2015.01)
*H01G 11/86* (2013.01)

(52) U.S. Cl.
CPC .......... *B29C 64/232* (2017.08); *B29C 64/236* (2017.08); *B33Y 30/00* (2014.12); *B33Y 50/02* (2014.12); *B29C 64/106* (2017.08); *B29L 2031/3468* (2013.01); *B33Y 10/00* (2014.12); *H01G 11/84* (2013.01); *H01G 11/86* (2013.01)

(58) Field of Classification Search
CPC .......... B29C 64/106; B29L 2031/3468; B33Y 30/00; B33Y 50/02; B33Y 10/00; H01G 11/86; H01G 11/84
USPC ........................................................ 425/166
See application file for complete search history.

(56) References Cited

U.S. PATENT DOCUMENTS

2017/0182698 A1* 6/2017 Susnjara ............... B29C 64/118
2018/0159037 A1* 6/2018 McAlpine ............. B29C 64/112

* cited by examiner

[FIG. 1]
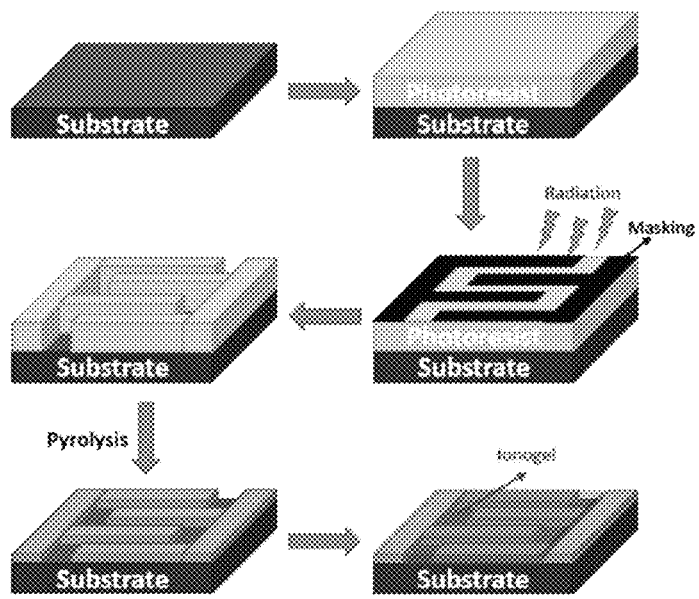
[FIG. 2]
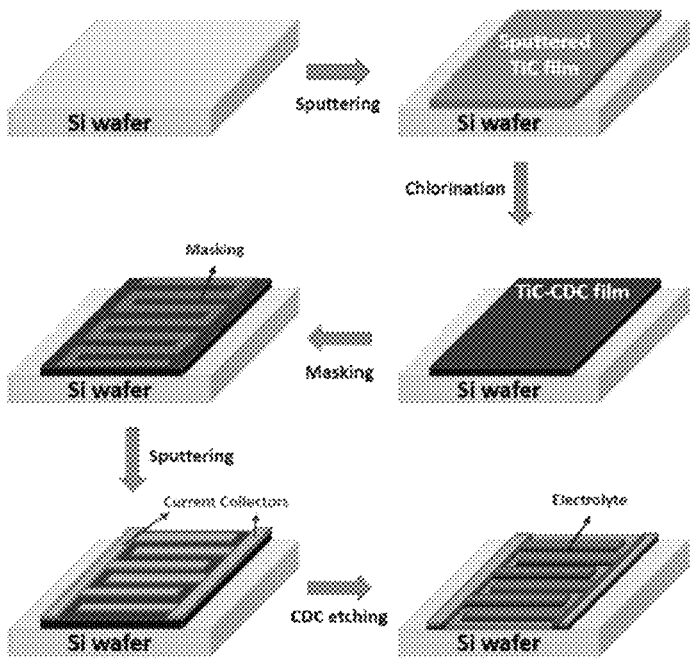

[FIG. 3]
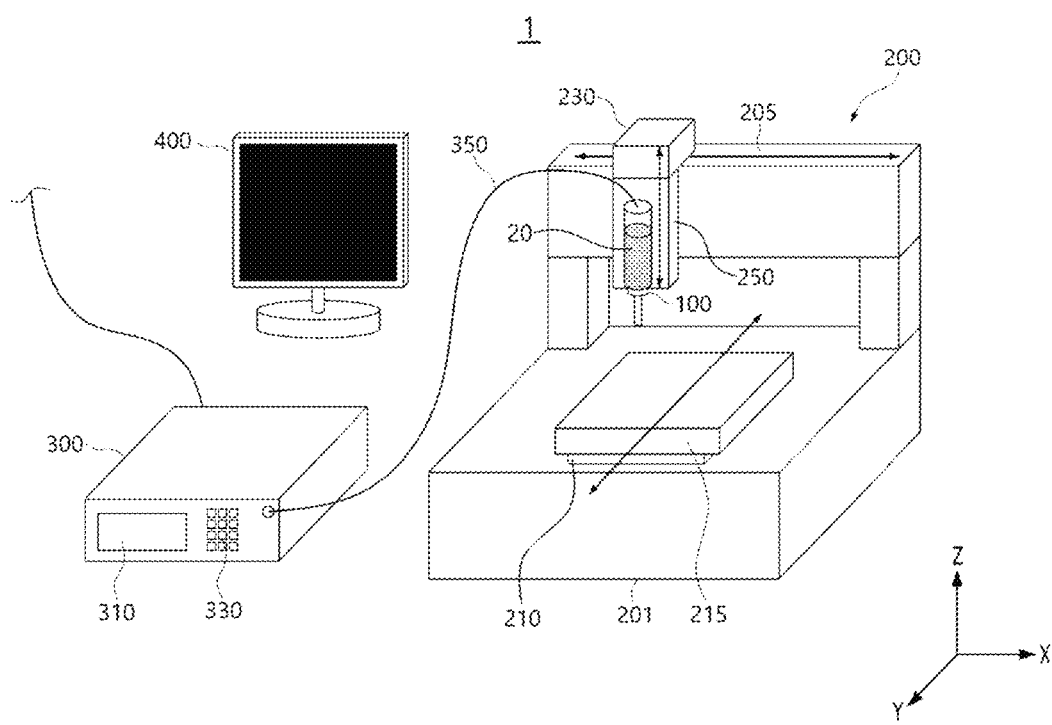
[FIG. 4]
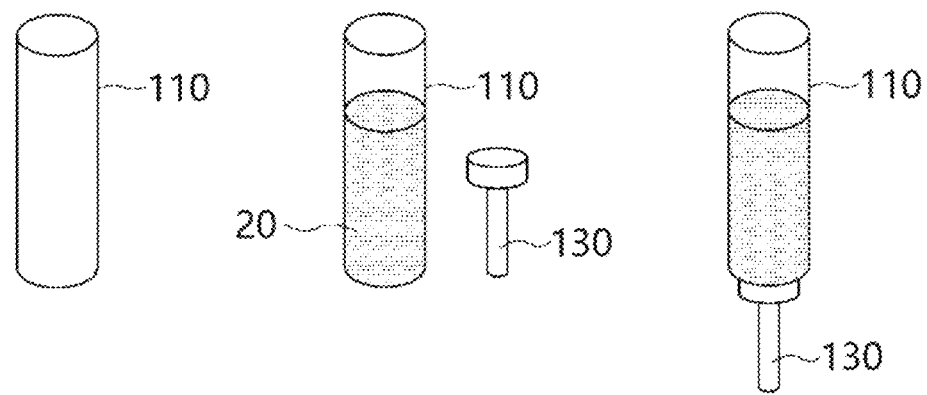

[FIG. 5]
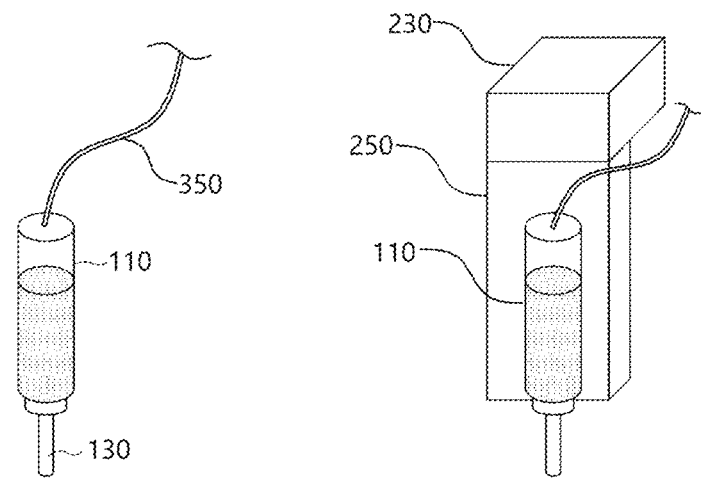
[FIG. 6]
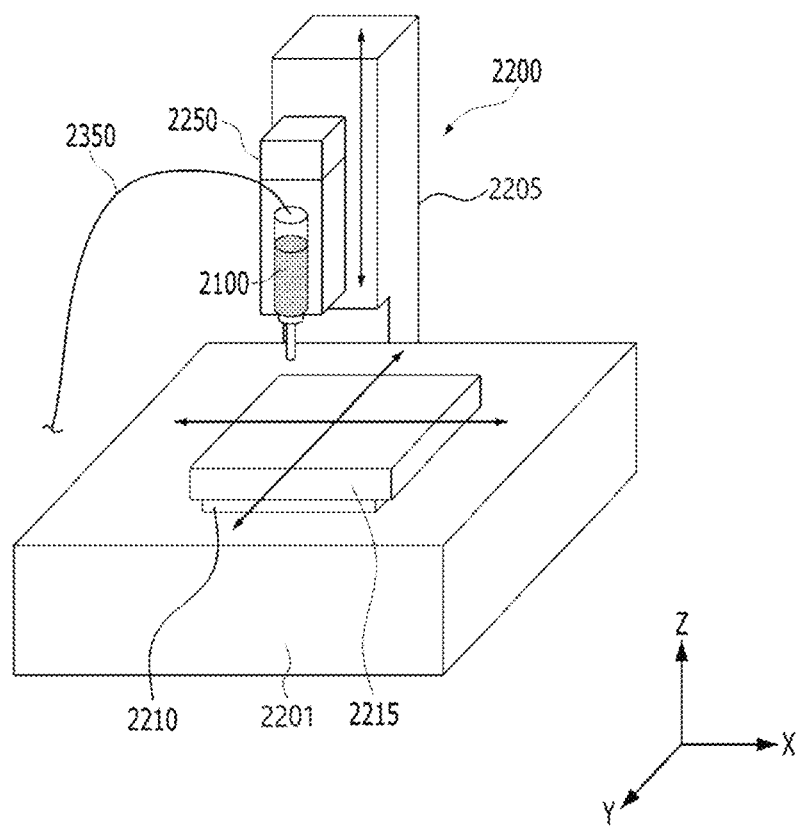

[FIG. 7]
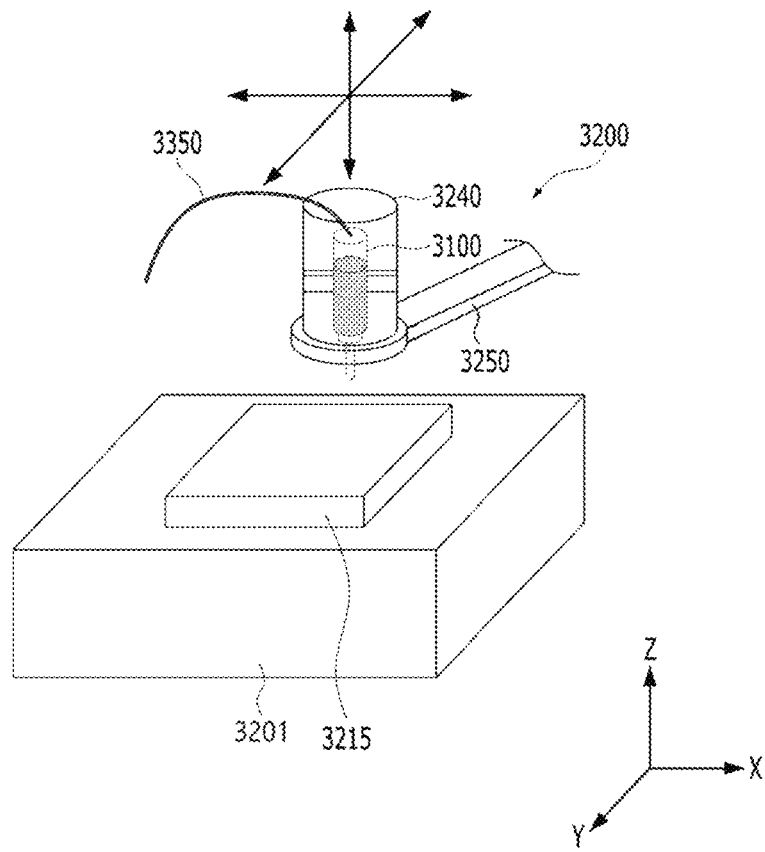
[FIG. 8]
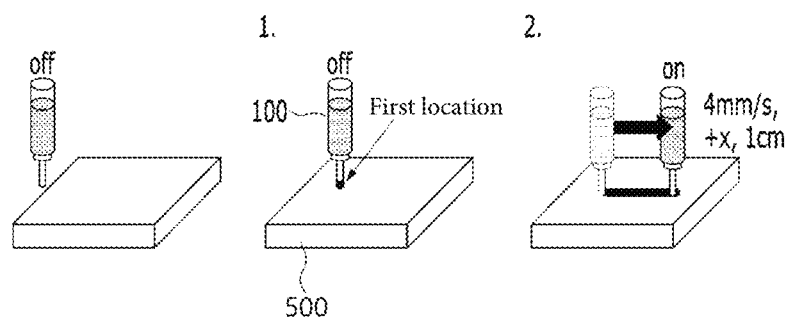

[FIG. 9]
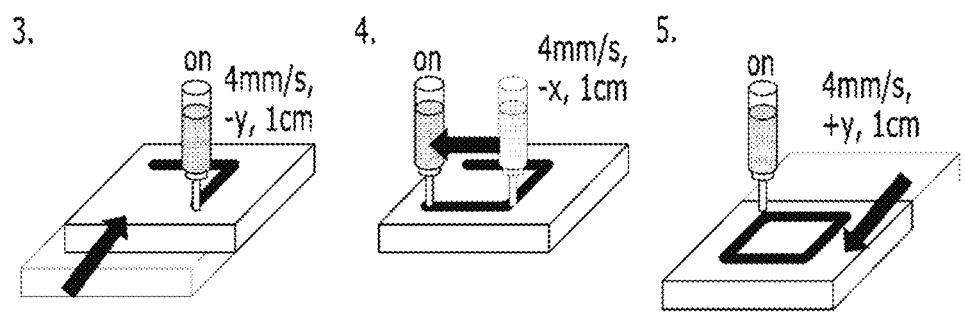
[FIG. 10]
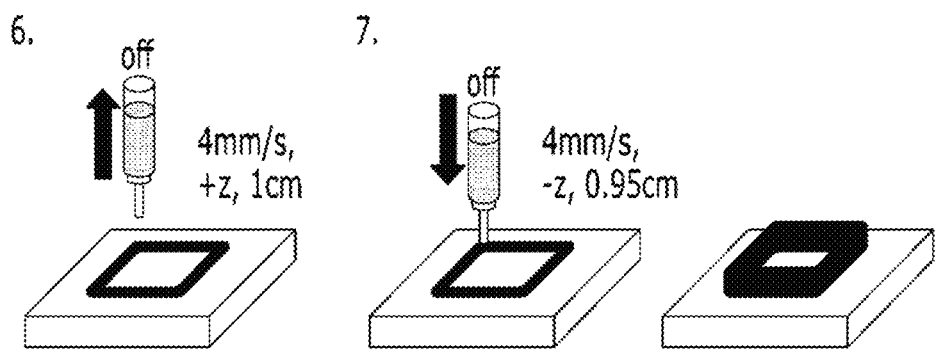

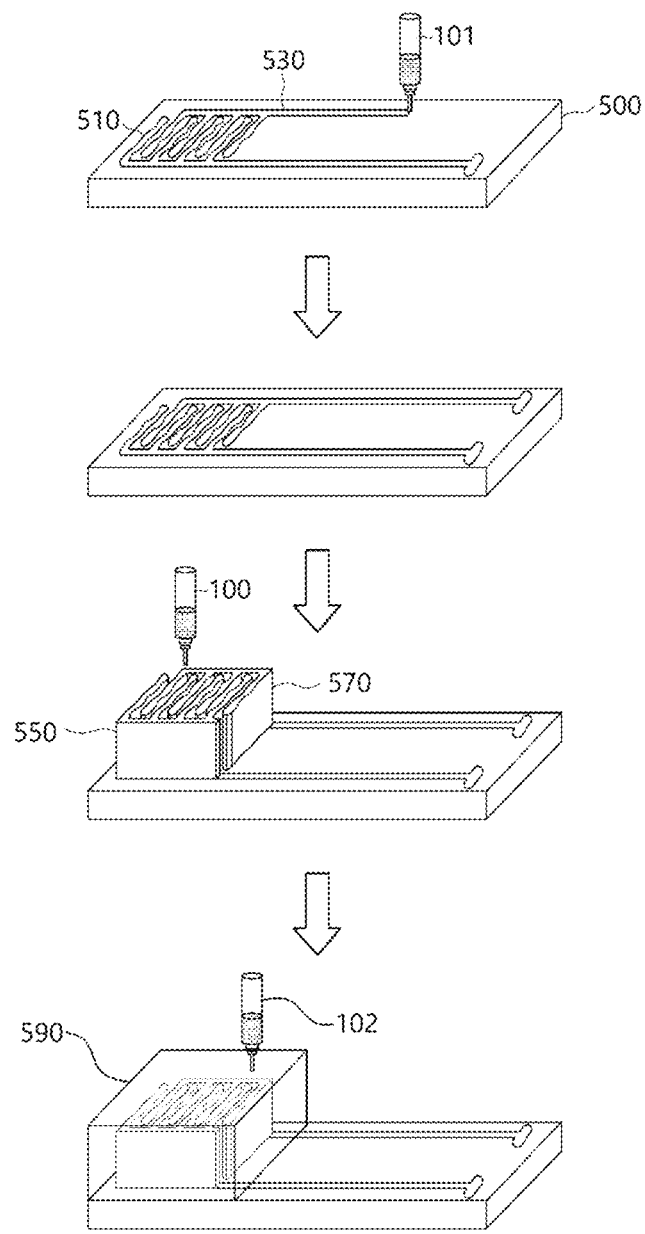
[FIG. 11]

3-D PRINTING APPARATUS FOR FABRICATING SUPERCAPACITOR OR SECONDARY BATTERY

BACKGROUND OF THE INVENTION

1. Technical Field

The present disclosure relates to a three-dimensional (3-D) printing apparatus for fabricating a supercapacitor or a secondary battery and, more particularly, to a 3-D printing apparatus for fabricating a supercapacitor or a secondary battery, which has an improved electric capacity.

2. Description of the Related Art

In general, a supercapacitor is a device using charges accumulated in an electric double layer and generated between a solid state electrode and an electrolyte, and is also called an electrochemical double layer capacitor (EDLC) or an ultra-capacitor. The supercapacitor has a lower energy density than the existing cell, but is expected to be used for applications for various fields as an ultra-high capacity cell having excellent characteristics and an almost semi-permanent lifespan in terms of power density for the instant supply of energy. In particular, recently, the supercapacitor is combined with a secondary cell as an auxiliary power source for an eco-friendly hybrid electric vehicle, and applications to load leveling are actively in progress.

The supercapacitor has a gravimetric energy density of a ½~1/10 level compared to the secondary cell depending on characteristics of an electrode active material. The power density of the supercapacitor indicative of the charging and discharging ability has an excellent characteristic of about 100 times or more.

The supercapacitor is configured with electrodes (positive pole and negative pole), an electrolyte, a separation membrane, a current collector, a casing, a terminal, etc. When a pair of solid state electrodes is put into an electrolyte ion solution and a DC voltage is applied to the electrodes, negative ions are electrostatically induced into a + polarized electrode and positive ions are electrostatically induced into a − polarized electrode, thereby forming an electric double layer at the interface of the electrodes and the electrolyte. In particular, if activated carbon is used as an electrode, a high capacity can be achieved because many fine pores are distributed to widen an electric double layer area.

The storage capacity of such a supercapacitor is proportional to the surface area of a positive pole and negative pole that are disposed to face each other. Accordingly, an electrode having a relatively wide surface area can be formed in the same area through an interdigitated electrode structure in which branch portions protruded from the positive pole and the negative pole, respectively, are disposed to go crisscross in a form in which fingers are interlocked. A microsupercapacitor having a very small size can be fabricated by the structure of an electrode having a wide surface area.

A method for fabricating a microsupercapacitor includes a method using a photolithography method (Korean Patent No. 10-1582768) and a method using a screen printing method (Korean Patent No. 10-1148126). Recently, a method using plasma etching is newly developed.

FIG. 1 is a diagram illustrating a process of fabricating a microsupercapacitor using a photolithography method. FIG. 2 is a diagram illustrating a process of fabricating a microsupercapacitor using plasma etching.

If such methods are used, a supercapacitor having a very small size can be fabricated, but there is a disadvantage in that a sufficient storage capacity is not obtained because the electrode of a fabricated supercapacitor has a thin thickness.

Accordingly, there is a need for a new apparatus or fabrication method capable of increasing the storage capacity of a microsupercapacitor by thickly forming an electrode.

As described above, the storage capacity of the microsupercapacitor may be increased as the surface area in which the positive pole and the negative pole face each other is increased and the electrode has a thicker thickness (i.e., as the height is increased). Furthermore, as the interval between the positive pole and the negative pole is reduced, the storage capacity may be increased. Accordingly, there is a need for an apparatus or fabrication method, which increases the thickness of an electrode, but can improve the storage capacity by narrowing the interval between a positive pole and a negative pole.

PRIOR ART DOCUMENT

Patent Document

Korean Patent No. 10-1582768
Korean Patent No. 10-1148126

SUMMARY OF THE INVENTION

The present disclosure provides a 3-D printing apparatus for fabricating a supercapacitor or secondary battery having an improved electric capacity by 3-D printing ink in a fine width.

Technical objects to be achieved in the present disclosure are not limited to the aforementioned technical objects, and other technical objects not described above may be evidently understood by a person having ordinary skill in the art to which the present disclosure pertains from the following description.

An embodiment of the present disclosure provides a three-dimensional (3-D) printing apparatus for fabricating a supercapacitor or secondary battery including an electrode portion having a positive pole part and negative pole part spaced apart from each other, an electrolyte filled between the positive pole part and the negative pole part, and a packaging portion for packaging the electrode portion and the electrolyte. The 3-D printing apparatus includes an ink output module including an ink supply unit in which an ink for forming any one of the electrode portion, the electrolyte and the packaging portion is received and an ink discharge unit coupled to the ink supply unit; a driving unit configured to move the ink output module in an X, Y, Z axis direction with respect to a substrate in which the supercapacitor or the secondary battery is to be formed, wherein the ink output module is mounted on the driving unit; a dispenser connected to the ink supply unit by a gas supply tube, for supplying gas having controlled pressure to the ink supply unit through the gas supply tube and outputting the ink within the ink supply unit through the ink discharge unit; and a controller configured to control the output of the ink by transmitting, to the dispenser and the driving unit, a control command for fabricating the supercapacitor or the secondary battery.

In an embodiment of the present disclosure, the ink discharge unit is detachably coupled to the ink supply unit in such a way as to be replaced depending on a width of the ink output. The ink supply unit may have a structure to which the gas supply tube is detachably coupled.

In an embodiment of the present disclosure, the driving unit may include a Z axis driving unit configured to move the ink output module in the Z axis direction, wherein the ink output module is detachably mounted on the Z axis driving unit; an X axis driving unit configured to move in the X axis direction along a guide unit installed in a fixing table and coupled to the Z axis driving unit to move the Z axis driving unit in the X axis direction; and a Y axis driving unit installed in the fixing table to move a work base on which the substrate is placed in the Y axis direction from the side under the ink output module.

In an embodiment of the present disclosure, the driving unit may include a lower driving unit configured to move a work base on which the substrate is placed in the X and Y direction and a Z axis driving unit configured to move the ink output module in the Z axis direction, wherein the ink output module is detachably mounted on the Z axis driving unit.

In an embodiment of the present disclosure, the driving unit may include a table supporting a work base on which the substrate is placed, a connection module on which the ink output module is mounted, and a transport module coupled to the connection module to move the connection module in the X, Y, Z axis direction.

In an embodiment of the present disclosure, the controller may be configured to form a first layer of any one of the electrode portion, the electrolyte and the packaging portion, raise the ink output module in the Z axis direction by controlling the driving unit, adjust the height of the ink output module in the Z axis direction in order to form a second layer by outputting the ink again at a location raised up to the height of the first layer.

In an embodiment of the present disclosure, the dispenser supplies an externally supplied gas to the ink supply unit at given pressure. The controller may be configured to receive information on shapes of the positive pole part and negative pole part of the supercapacitor, generate the control command based on the information, control the driving unit in response to the control command, and control a supply or blocking of the gas for the ink supply unit by the dispenser.

In an embodiment of the present disclosure, the inner diameter of the ink discharge unit may be 20~600 μm, and pressure of the gas supplied from the dispenser to the ink supply unit may be 20~800 kPa.

In an embodiment of the present disclosure, the positive pole part may include a first current collector and a positive pole formed on the first current collector. The negative pole part may include a second current collector and a negative pole formed on the second current collector. The ink output module may include an ink output module for current collector in which an ink for current collector for forming the first current collector and the second current collector has been received, an ink output module for electrode in which an ink for electrode for forming the positive pole and the negative pole has been received, an ink output module for electrolyte in which an ink for electrolyte for forming the electrolyte has been received, and an ink output module for packaging in which an ink for packaging for forming the packaging portion has been received.

In an embodiment of the present disclosure, after the ink is supplied to the ink supply unit, the ink discharge unit may be coupled to the ink supply unit by a screw or using a Luer lock method, the gas supply tube may be connected to the ink supply unit, and the ink output module may be mounted on the driving unit.

In an embodiment of the present disclosure, the dispenser may include a gas supply pressure control panel enabling a user to input or adjust supply pressure of the gas and a situation display panel displaying information on at least one of supply pressure of the gas, pressure within the ink supply unit, and a discharge state of the ink.

BRIEF DESCRIPTION OF THE DRAWINGS

FIG. 1 is a diagram illustrating a process of fabricating a microsupercapacitor using a photolithography method.

FIG. 2 is a diagram illustrating a process of fabricating a microsupercapacitor using plasma etching FIG. 3 is a diagram illustrating a 3-D printing apparatus for fabricating a supercapacitor or secondary battery according to an embodiment of the present disclosure.

FIGS. 4 and 5 are diagrams for describing the ink output module of the 3-D printing apparatus for fabricating a supercapacitor or secondary battery and a printing preparation process according to embodiments of the present disclosure.

FIG. 6 is a diagram illustrating a 3-D printing apparatus for fabricating a supercapacitor or secondary battery according to another embodiment of the present disclosure.

FIG. 7 is a diagram illustrating a 3-D printing apparatus for fabricating a supercapacitor or secondary battery according to another embodiment of the present disclosure.

FIGS. 8 to 10 are diagrams for describing examples of a printing operation of the 3-D printing apparatus for fabricating a supercapacitor or secondary battery according to the present embodiment.

FIG. 11 is a diagram describing an example of a method of fabricating a supercapacitor using the 3-D printing apparatus for fabricating a supercapacitor or secondary battery according to the present embodiment.

<Description of reference numerals>

1: 3-D printer apparatus
20: ink for electrode
100: ink output module
110: ink supply unit
130: ink discharge unit
200: driving unit
210: Y axis driving unit
215: work base
230: X axis driving unit
250: Z axis driving unit
300: dispenser
310: situation display panel
330: pressure control panel
400: controller
500: substrate
510: first current collector
530: second current collector
550: positive pole
570: negative pole
2200, 3200: driving unit

DETAILED DESCRIPTION

Embodiments of the present disclosure are described hereinafter in detail with reference to the accompanying drawings. The present disclosure may be modified in various different ways, and is not limited to the disclosed embodiments herein. In order to clarify a description of the invention, a description of parts not related to the description is omitted, and the same reference numbers are used throughout the specification to refer to the same or like parts.

In the entire specification, when it is described that one part is "connected (or coupled to or combined with or brought into contact with)" the other part, the one part may be "directly and electrically coupled" to the other part or may be "indirectly and electrically coupled" to the other part through a third part. Furthermore, when it is said that one part "includes" the other part, the word "include" will be understood to imply the inclusion of stated parts but not the exclusion of any other parts, unless explicitly described to the contrary.

The terms used in this specification are used to only describe specific embodiments and are not intended to restrict the invention. An expression of the singular number should be construed as including an expression of the plural number unless clearly defined otherwise in the context. It is to be understood that in this specification, a term, such as "include (or comprise)" or "have", is intended to designate that a characteristic, number, step, operation, element or part which is described in the specification or a combination of them are present and does not exclude the existence or possible addition of one or more other characteristics, numbers, steps, operations, elements, parts or combinations of them in advance.

Hereinafter, embodiments of the present disclosure are described in detail with reference to the accompanying drawings.

An electrolyte instead of a dielectric may be used for a supercapacitor. The supercapacitor is an energy storage device for storing electric energy in such a way as to form, on a surface of an electrode, a pair of charge layers (i.e., electric double layer) included in the electrolyte and having different signs. The supercapacitor is also called an electrochemical double layer capacitor (EDLC). As other types of supercapacitor, pseudo-capacitors and hybrid capacitors have been developed. Pseudo-capacitors store electric charge by a very fast and reversible oxidation-reduction reaction that occurs at the interface between the electrode and electrolyte ions. Hybrid capacitors with an improved energy density have been developed by comprising a high-power characteristic electrode material formed through the sorption of ions and a high-energy electrode material as the counter electrode formed through ion insertion/intercalation.

The pseudo-capacitor and the hybrid capacitor are different from the supercapacitor in that they do not physically accumulate electric charges, but have a form of the supercapacitor in their overall structure. Accordingly, a method of fabricating the supercapacitor may be applied to the pseudo-capacitor and the hybrid capacitor. For this reason, in this specification, the term "supercapacitor" does not mean only an electric double layer capacitor, but is used as an upper concept including all capacitors having the same structure, such as the pseudo-capacitor and the hybrid capacitor. Accordingly, it is to be construed that in this specification, a technology using the term "supercapacitor" is not limited to an electric double layer capacitor, but may also be applied to pseudo-capacitors and hybrid capacitors.

FIG. 3 is a diagram illustrating a 3-D printing apparatus for fabricating a supercapacitor or secondary battery according to an embodiment of the present disclosure.

The 3-D printing apparatus 1 for fabricating a supercapacitor or a secondary battery may include an ink output module 100, a driving unit 200, a dispenser 300 and a controller 400.

The 3-D printing apparatus for fabricating a supercapacitor or secondary battery (hereinafter referred to as the "3-D printing apparatus") according to the present embodiment may fabricate an energy conversion/storage device, such as a supercapacitor or a secondary battery, using a properly fabricated ink.

The 3-D printing apparatus according to the present embodiment forms an electrode portion having a positive pole part and negative pole part spaced apart from each other to form a supercapacitor or secondary battery, an electrolyte filled between the positive pole part and the negative pole part, and a packaging portion for packaging the electrode portion and the electrolyte using a 3-D printer.

In particular, in the present embodiment, a supercapacitor or secondary battery having an increased electric capacity can be fabricated using an ink for a 3-D printer which has been specially fabricated for the supercapacitor or secondary battery. In the present embodiment, the 3-D printing apparatus 1 for fabricating a supercapacitor, for example, is described.

In the supercapacitor, a positive pole part may include a first current collector and a positive pole formed on the first current collector. A negative pole part may include a second current collector and a negative pole formed on the second current collector. The 3-D printing apparatus according to the present embodiment can fabricate a supercapacitor by 3-D-printing inks fabricated for a current collector, electrodes (i.e., positive pole and negative pole), an electrolyte, and a packaging portion, respectively.

The inventors of the present disclosure have fabricated inks necessary to form a supercapacitor by 3-D-printing the current collector, electrodes (i.e., positive pole and negative pole), electrolyte and packaging portion of the supercapacitor using the 3-D printing apparatus 1 according to the present embodiment. Hereinafter, an ink for a 3-D printer for fabricating a supercapacitor or secondary battery (hereinafter referred to as "ink for electrode") is basically described.

An ink for electrode 20 may include an electrode active material, a conductive agent, a binder, a dispersing agent, and a solvent.

In fabricating the ink for electrode 20, assuming that the electrode active material, conductive agent and binder are electrode materials, the electrode active material of 50~90 wt %, the conductive agent of 1~40 wt %, and the binder of 1~20 wt % with respect to a total weight of the electrode materials were mixed and fabricated. The dispersing agent of 0.1~10 wt % compared to the sum of the weights of the electrode materials (i.e., electrode active material, conductive agent, and binder) was added and fabricated. The ink for electrode 20 to which the dispersing agent was added was fabricated by adding the solvent having a ratio of 1~3 times at the ratio of the sum of the weights of the electrode materials versus the volume.

The electrode active material means a material that is actually involved in an electrode reaction in the electrodes (i.e., positive pole 550 and the negative pole 570 (refer to FIG. 11)) on both sides. A carbon-based material or metal oxides may be used in the electrode active material depending on an energy storage mechanism. A carbon material that is economic and eco-friendly and that has a wide specific surface area may be chiefly used in the electrode active material. For example, activated carbon, a carbon nano tube (CNT), graphene or carbon aerogel may be used as the carbon material used in the electrode active material.

The conductive agent is a material used to enhance conductivity between the electrode materials. Carbon black, such as acetylene black, Ketjen black or Super_P®, may be used as the conductive agent. In addition, any material having high electrical conductivity and not affecting a chemical change in the electrode active material and binder may be adopted as the conductive agent.

The binder functions to bond the electrode active material and the conductive agent or to bind them to the current collector. For example, carboxymethyl cellulose (CMC), styrene butadiene rubber (SBR), polyvinylidene fluoride (PVDF) or poly tetra fluoroethylene (PTFE) may be used as the binder.

The dispersing agent functions to disperse the electrode materials within the solvent so that the viscosity of the ink for electrode 20 is reduced to facilitate coating.

A polymer-based dispersing agent, a polyurethane-based dispersing agent, polyvinylpyrrolidone (PVP) or a surfactant (e.g., Triton X-100) may be used as the dispersing agent. Any material that does not cause a chemical change in the electrode materials and can reduce the viscosity of the ink for electrode 20 may be used as the dispersing agent, but the present disclosure is not limited to the examples.

If an excess of quantity of the dispersing agent is added to the ink for electrode 20, electrochemical performance is deteriorated because the dispersing agent acts as resistance. If a too small amount of the dispersing agent is added to the ink for electrode 20, an effect in that the viscosity of the ink for electrode 20 is reduced cannot be obtained. Accordingly, the dispersing agent of 0.1~10 wt % compared to electrode solids (i.e., the electrode materials) may be added.

The following homogenization-mixing apparatus may be used to uniformly mix an electrode materials-solvent mixture. In general, a stirrer, a homogenizer, an ultrasonic homogenizer, a bead mill, a roll mill and/or a revolution-rotation type planetary mixer may be used as the homogenization-mixing apparatus.

The ink for electrode 20 to which the dispersing agent was added was fabricated using the following method, for example.

First, activated carbon (e.g., YP-50F, Kuraray Chemical) as the electrode active material, carbon black (e.g., Super-P®) as the conductive agent, and polyvinylidene fluoride (PVDF) as the binder were added to an N-Methyl-2-pyrrolidone (NMP) solvent. Thereafter, the dispersing agent having a given ratio was added.

As described above, the dispersing agent was added to the electrode materials, including the electrode active material, the binder and the conductive agent. An electrode materials-solvent mixture including the dispersing agent was formed by adjusting the viscosity of the mixture through control of the amount of the solvent.

The electrode materials-solvent mixture including the dispersing agent was mixed by the revolution-rotation type planetary mixer.

In this case, in the mixing speed, revolution of 2000 RPM and rotation, that is, 2.5 times the revolution speed, were performed for 25 minutes. The mixed ink was rotated with revolution of 2200 RPM and rotation, that is, 0 times (stop) the revolution speed, for 5 minutes. The ink for electrode 20 was fabricated by removing bubbles remaining in the mixed ink.

The ink for electrode 20 from which bubbles have not been removed may cause a phenomenon in which printouts are broken due to the bubbles upon output. It is very important to remove bubbles within the ink for electrode 20 because a problem in that the ink for electrode 20 cannot be stacked as a firm structure or an electrode is short-circuited occurs due to the bubble occurrence phenomenon.

If the dispersing agent is introduced, for example, the amount of a solvent may be smaller than that used in a conventional technology.

This means that a high-density electrode ink including more electrode materials in the same volume can be fabricated. A device (e.g., supercapacitor) having higher performance can be fabricated by the 3-D printing apparatus of the present embodiment using the ink for electrode 20 according to the present embodiment.

Furthermore, if the viscosity of the ink for electrode 20 is reduced, a device having a finer shape can be fabricated because the ink for electrode 20 can be smoothly output through an ink discharge unit having a narrower inner diameter.

FIGS. 4 and 5 are diagrams for describing the ink output module 100 of the 3-D printing apparatus for fabricating a supercapacitor or secondary battery and a printing preparation process according to embodiments of the present disclosure.

Referring to FIGS. 3 to 5, as described above, the 3-D printing apparatus 1 may include the ink output module 100, the driving unit 200, the dispenser 300 and the controller 400.

As described above, the 3-D printing apparatus 1 may fabricate an energy conversion/storage device, such as a supercapacitor or a secondary battery, through a process of stacking the ink for electrode 20 fabricated a described above, a properly fabricated ink for current collector, an ink for electrolyte, and an ink for packaging through 3-D printing.

That is, in the present embodiment, the ink output module of the 3-D printing apparatus may include an ink output module for current collector in which an ink for forming a current collector has been received, an ink output module for electrode 100 in which the ink for electrode 20 for forming a positive pole and a negative pole has been received, an ink output module for electrolyte, and an ink output module for packaging in which a packaging ink for forming a packaging portion has been received.

The structure of the ink output module may be changed depending on the type (for use in a current collector, electrode, electrolyte or packaging) of ink used. The ink output modules have the same basic structure, but only the nozzle size of a discharge unit may be different.

Hereinafter, the ink output module for electrode 100 for outputting the ink for electrode 20 (hereinafter referred to as the "ink output module") is described as an example.

The ink output module 100 may form a device by outputting the ink for electrode 20 by pressure gas provided by the dispenser 300 in the state in which the ink for electrode 20 has been received.

The ink output module 100 is mounted on the driving unit 200. The driving unit 200 may move the ink output module 100 in an X, Y, Z axis direction with respect to a substrate 500 (refer to FIG. 8) on which a device will be formed.

The driving unit 200 may include a Y axis driving unit 210, an X axis driving unit 230, and a Z axis driving unit 250. The driving unit 200 may form a device by discharging (or outputting) the ink for electrode 20 in response to a control command from the controller 400, while moving the ink output module 100 top and bottom (Z axis direction), front and back (Y axis direction), and left and right (X axis direction).

Hereinafter, the ink output module 100 and the driving unit 200 are described more specifically.

The ink output module 100 may include an ink supply unit 110 and an ink discharge unit 130.

The ink supply unit 110 is a portion where an ink of a liquid, gel or slurry form is contained, and may have a syringe form not having a needle and made of a plastic or metal material. In the present embodiment, in order to improve the electric capacity of a supercapacitor, the ink for electrode 20 used in the 3-D printing apparatus 1 may be provided to the ink supply unit 110 (refer to the first and second drawings from the left in FIG. 4).

The ink discharge unit 130 is a portion from which the ink for electrode 20 is directly output, and may have a needle or nozzle form. The ink discharge unit 130 may be coupled to the ink supply unit 110 in which the ink for electrode 20 is contained by a screw or using a Luer lock method (refer to the third drawing from the left in FIG. 4).

The ink discharge unit 130 may be changed depending on a required width of an output ink or the width of an object fabricated by the ink for electrode 20. The range of an inner diameter of the ink discharge unit 130 is about 600~20 μm, and may be selected in various ways.

The top of the ink supply unit 110 may have a structure coupled to a gas supply pipe 350 (e.g., gas supply tube), and may be connected to the dispenser 300 by the gas supply pipe 350. The ink output module 100 connected to the gas supply pipe 350 may be mounted on the Z axis driving unit 250 (refer to FIGS. 3 and 5).

When the dispenser 300 supplies a gas at given pressure, the gas is supplied to the ink supply unit 110 through the gas supply pipe 350. The gas pushes the ink for electrode 20 within the ink supply unit 110. The ink for electrode 20 may be output from the ink discharge unit 130 to a work base 215. When the supply of the gas is blocked, the output of the ink for electrode 20 may be stopped.

The ink output module 100 may be detachably mounted on the Z axis driving unit 250. The Z axis driving unit 250 may move the ink output module 100 in the Z axis direction. The X axis driving unit 230 may move in the X axis direction along a guide unit 205 installed in a fixing table 201. The Z axis driving unit 250 is coupled to the X axis driving unit 230. Accordingly, the X axis driving unit 230 may move the Z axis driving unit 250 in the X axis direction. The Y axis driving unit 210 may be installed in the fixing table 201, and may move the work base 215 on which a substrate is placed in the Y axis direction from the side under the ink output module 100.

The X axis driving unit 230 and the Z axis driving unit 250 are coupled to operate substantially like a single robot arm.

An output object by the ink for electrode 20 is placed on the work base 215, and may be 3-D-printed in response to a relative movement of the work base 215.

Each of the driving units may include a driving element, such as a motor. Precise movement equipment using such driving elements may use known devices, and thus a further description thereof is omitted.

For example, the work base 215 may be relatively moved in the Y axis direction with respect to the ink output module 100 by the Y axis driving unit 210, so a shape of an output object (e.g., the electrode of a supercapacitor) in the Y axis direction may be adjusted. The Z axis driving unit 250 may be moved in the X axis direction by the X axis driving unit 230. Accordingly, the ink output module 100 mounted on the Z axis driving unit 250 may be moved in the X axis direction with respect to the work base 215.

Furthermore, the ink output module 100 may be moved in the Z axis direction by the Z axis driving unit 250. Accordingly, an interval, that is, height, between the ink discharge unit 130 and the work base 215 may be adjusted. As a result, the height of the output object may be adjusted.

For example, after the first layer of the output object is output, the ink discharge unit 130 may be raised by the height of the first layer and the second layer of the output object may be output. The height of the output object may be adjusted by repeating such a process.

In the present embodiment, for example, an operating range of the X axis driving unit 230 and the Y axis driving unit 210 may be 0~300 mm, and a moving speed thereof may be 0.1~500 mm/s. An operating range of the Z axis driving unit 250 may be 0~80 mm, and a moving speed thereof may be 0.1~400 mm/s. The operating range of each of the elements of the driving unit 200 may be precisely controlled up to a unit of 0.001 mm.

The dispenser 300 may supply, to the ink supply unit 110, a gas (e.g., air, nitrogen or inert gas, such as argon) supplied from the outside (e.g., gas storage tank), while constantly maintaining gas pressure. For example, the range of pressure of a gas which may be supplied to the ink supply unit 110 of the 3-D printer apparatus 1 by the dispenser 300 is 20~800 kPa.

The dispenser 300 may include a situation display panel 310 and a gas supply pressure control panel 330. A user may input or adjust the supply pressure of a gas through the gas supply pressure control panel 330. Alternatively, a user may turn on or off the supply of a gas by controlling the dispenser 300 through the controller 400. The gas pressure of a gas is adjusted by the dispenser 300, but may be adjusted by controlling the pressure adjustment unit of the dispenser 300 through the controller 400. Information on supply pressure of a gas, pressure within the ink supply unit 110, or the discharge state of the ink for electrode 20 may be displayed on the situation display panel 310.

The controller 400 may control the output or blocking of the ink for electrode 20 for the ink discharge unit 130 by repeating the supply or blocking of a gas, maintained to given pressure by the dispenser 300, with respect to the ink supply unit 110 through the gas supply pipe 350. Accordingly, the controller 400 may control the amount of the ink for electrode 20 supplied to the ink supply unit 110 through the dispenser 300. Accordingly, the width and thickness of an output ink for electrode 20 may be different depending on the amount.

The controller 400 (e.g., PC) may generate or configure a command to control the 3-D printing apparatus 1 so that an output object having a shape input or instructed by a user is formed. The controller 400 may control the dispenser 300 and the driving unit 200 connected thereto by cables by transmitting the generated or configured command information to the two devices.

That is, the controller 400 may instruct the dispenser 300 to supply or block a gas. Furthermore, the controller 400 may control the distance and speed of the driving unit 200 that moves in the X, Y, Z axis direction. For example, a command configured by the controller 400 may be configured with the on/off of the dispenser 300 and the moving speed and coordinates of the driving unit 200 as follows.

step 1. dispenser (on)
step 2. v: 4 mm/s, x: +1.000, y: +0.000, z: +0.000
step 3. v: 4 mm/s, x: +0.000, y: −1.000, z: +0.000
step 4. dispenser (off)

FIG. 6 is a diagram illustrating a 3-D printing apparatus for fabricating a supercapacitor or secondary battery according to another embodiment of the present disclosure.

In the present embodiment, the 3-D printing apparatus is similar to the 3-D printing apparatus of FIGS. 3 to 5 except a driving unit 2200, and thus a redundant description thereof is omitted.

In the present embodiment, the driving unit 2200 may include a lower driving unit 2210 for moving a work base 2215 on which a substrate is positioned in an X and Y axis direction, and a Z axis driving unit 2250 on which the ink output module 2100 is detachably mounted, for moving the ink output module 2100 in a Z axis direction.

The lower driving unit 2210 may be installed in a fixing table 2201. The Z axis driving unit 2250 may move in the Z axis direction along a guide unit 2205 installed in the fixing table 2201.

A corresponding layer of an output object may be formed by outputting an ink through the ink output module 2100, while maintaining the height of the Z axis driving unit 2250 and moving the work base 2215 in the X and Y direction by the lower driving unit 2210.

Thereafter, the height of the Z axis driving unit 2250 is raised, and a layer of the output object may be stacked while moving the work base 2215 in the X and Y direction by the lower driving unit 2210.

FIG. 7 is a diagram illustrating a 3-D printing apparatus for fabricating a supercapacitor or secondary battery according to another embodiment of the present disclosure.

In the present embodiment, the 3-D printing apparatus is similar to the 3-D printing apparatus of FIGS. 3 to 5 except a driving unit 3200, and thus a redundant description thereof is omitted.

In the present embodiment, the driving unit 3200 may include a table 3201 for supporting a work base 3215 on which a substrate is positioned, a connection module 3240 on which an ink output module 3100 is mounted, and a transport module 3250 coupled to the connection module 3240, for moving the connection module 3240 in an X, Y and Z axis direction.

The connection module 3240 may be a frame on which the ink output module 3100 is mounted and fixed. The transport module 3250 may be a kind of robot arm. The transport module 3250 may be coupled to the connection module 3240 in such a way as to rotate. The transport module 3250 may move the connection module 3240 in the X, Y, Z axis direction. Accordingly, the ink output module 3100 may also be moved in the X, Y, Z axis direction.

FIGS. 8 to 10 are diagrams for describing examples of a printing operation of the 3-D printing apparatus for fabricating a supercapacitor or secondary battery according to the present embodiment.

The ink output module 100 may be mounted on the driving unit illustrated in FIGS. 3, 6 and 7 and operated. Hereinafter, a case where the ink output module 100 is mounted on the driving unit 200 illustrated in FIG. 3 is described as an example.

As described above, the controller 400 may generate or configure a command to control the 3-D printing apparatus so that a shape of an output object input or instructed by a user is formed.

The examples proposed in FIGS. 8 to 10 illustrate an example of an operation of stacking a device having a 1 cm×1 cm rectangle form using the 3-D printing apparatus 1.

The controller 400 may configure, in the following form, a control command corresponding to a printing process of a device having the rectangle form illustrated in FIGS. 8 to 10, and may transmit the control command to the driving unit 200 and the dispenser 300.

Step 1. Dispenser: off, driving unit: move to the first output location
Step 2. Dispenser: on, driving unit: +x axis direction, a speed of 4 mm/s, a movement of 1 cm.
Step 3. Dispenser: on, driving unit: −y axis direction, a speed of 4 mm/s, a movement of 1 cm.
Step 4. Dispenser: on, driving unit: −x axis direction, a speed of 4 mm/s, a movement of 1 cm.
Step 5. Dispenser: on, driving unit: +y axis direction, a speed of 4 mm/s, a movement of 1 cm.
Step 6. Dispenser: off, driving unit: +z axis direction, a speed of 4 mm/s, a movement of 1 cm.
Step 7. Dispenser: off, driving unit: −z axis direction, a speed of 4 mm/s, a movement of 0.95 cm.
Repeat Steps 2 to 7

The controller 400 may form the electrodes of a supercapacitor or secondary battery by repeatedly stacking the ink for electrode 20, and may block the output of the ink for electrode 20 by turning off the supply of a gas through control of the dispenser 300 when the ink output module 100 is moved in the Z axis direction.

In the present embodiment, when a gas supplied through the dispenser 300 is blocked, the output of the ink for electrode 20 from the ink discharge unit 130 is stopped. Accordingly, the first layer of an output object may be formed like a single line drawing. If the area of the output object is wide, however, the first layer may be formed by performing a plurality of output and blocking operations on the ink for electrode 20. Thereafter, the ink output module 100 is raised and dropped in the Z axis direction. Thereafter, the second layer of the output object may be formed by controlling the output/blocking of the ink for electrode 20. Accordingly, the output object may be formed to a required thickness (height) by such a repetition process.

FIG. 11 is a diagram describing an example of a method of fabricating a supercapacitor using the 3-D printing apparatus 1 according to the present embodiment.

For the fabrication of a supercapacitor, as illustrated in FIG. 11, first, a first current collector 510 and a second current collector 530 are formed on a substrate 500 so that they correspond to a positive pole 550 and negative pole 570 to be formed in a subsequent process, respectively (refer to the first and second drawings from the top in FIG. 11). The first current collector 510 and the second current collector 530 may be formed on the substrate 500 by printing using the ink output module for current collector 101 by the 3-D printing apparatus 1 according to the present embodiment. If electrodes are formed on the current collectors in the same shape, a plane shape of the current collector becomes a plane shape of the electrode.

For example, in one embodiment, the size of the substrate 500 on which the supercapacitor is formed may be 20×50 mm, and a portion on which the current collectors and the ink for electrode 20 are printed may have a 10 mm×10 mm area. Accordingly, an operation control method of the 3-D printer when a device having a 1 cm×1 cm rectangle form proposed in FIGS. 8 to 10 is fabricated may be applied. Branch portions protruded from the positive pole 550 and the negative pole 570, respectively, are disposed to go crisscross so that an electrode has a wide surface area. Accordingly, an interdigitated electrode structure positioned in a form in which fingers are interlocked may be stacked. The width and interval may be designed based on the number of protruded branches.

A drawing to which the ink is discharged may be fabricated using computer software. In this case, a PC-controlled image recognition coating system may be used.

In another embodiment, the first current collector 510 and the second current collector 530 may be formed on the substrate 500 using another method, such as electroplating or deposition.

Thereafter, the positive pole 550 and the negative pole 570 of a supercapacitor may be formed to a set height (or thickness) by performing repeated printing on the first current collector 510 and second current collector 530 formed in the substrate 500 placed on the work base 215 using the ink output module 100 in which the ink for electrode 20 has been contained (refer to the third drawing from the top in FIG. 11).

If the current collector and the electrode are made of the same material, the ink output module for current collector 101 and the ink output module for electrode 100 may be the same module.

Thereafter, the supercapacitor may be fabricated by filling the substrate 500 in which the positive pole 550 and the negative pole 570 have been formed with an electrolyte. In this case, the electrolyte may be a liquid, a quasi-solid having high viscosity or a solid electrolyte. Furthermore, such an electrolyte may be filled by a simple injection method, but an electrolyte 590 may be output and formed using the ink output module for electrolyte 102 by the 3-D printing apparatus according to the present embodiment (refer to the fourth drawing from the top in FIG. 11).

Thereafter, the supercapacitor or secondary battery may be fabricated by sealing or packaging a device in which the electrode portion (i.e., current collector and electrode) and the electrolyte have been formed using an ink output module (not illustrated) in which the ink for packaging has been contained by the 3-D printing apparatus.

As described above, in fabricating the supercapacitor or secondary battery, an error that the width of the ink for electrode 20 output to print the positive pole 550 and the negative pole 570 will be out of the region where an electrode (e.g., current collector) will be formed is increased as the width is increased. Accordingly, to narrow the interval between the positive pole 550 and the negative pole 570 is limited.

The 3-D printing apparatus 1 according to the present embodiment performs 3-D printing using the ink for electrode 20 to which the dispersing agent fabricated as described above has been added. Accordingly, the viscosity of the ink for electrode 20 can be conveniently adjusted based on a shape or characteristic of an output object, and thus the ink discharge unit 130 having a very small inner diameter can be used. According to the 3-D printing apparatus having the ink discharge unit 130 according to the present embodiment, a supercapacitor or a secondary battery can be fabricated by outputting the ink for electrode 20 in a fine width, in the present embodiment, 280~60 µm by precisely controlling each of the driving units to a 0.001 mm unit.

That is, the ink for electrode 20 can be output in a fine width by performing 3-D printing on the ink for electrode 20 using the 3-D printing apparatus 1 according to the present embodiment. Accordingly, the interval between the positive pole 550 and the negative pole 570 formed on the first current collector 510 and the second current collector 530 in which electrodes will be formed can be designed to be narrower than that in a conventional technology.

Accordingly, the 3-D printing apparatus 1 can fabricate a supercapacitor or secondary battery having a significantly high electric capacity because a thickness is sufficiently great and the interval between the positive pole 550 the negative pole 570 is narrowed.

An embodiment of the present disclosure can provide the 3-D printing apparatus capable of fabricating a supercapacitor or secondary battery having a high electric capacity by receiving the design of a supercapacitor or secondary battery through the controller and performing 3-D printing on an ink for forming an electrode portion, an ink for an electrolyte or an ink for a packaging portion in a fine width.

It is to be understood that effects of the present disclosure are not limited to the above effects and include all effects which may be reasoned from the configuration of an invention written in the detailed description or the claims.

The description of the present disclosure is illustrative, and a person having ordinary knowledge in the art to which the present disclosure pertains will understand that the present disclosure may be easily modified in other detailed forms without changing the technical spirit or essential characteristic of the present disclosure. Accordingly, it should be construed that the aforementioned embodiments are only illustrative in all aspects, and are not limitative. For example, elements described in the singular form may be carried out in a distributed form. Likewise, elements described in a distributed form may also be carried out in a combined form.

The scope of the present disclosure is defined by the appended claims rather than by the detailed description, and all changes or modifications derived from the meanings and scope of the claims and equivalents thereto should be interpreted as being included in the scope of the present disclosure.

What is claimed is:

1. A three-dimensional (3-D) printing apparatus for fabricating a supercapacitor or a secondary battery comprising an electrode portion having a positive pole part and a negative pole part spaced apart from each other, an electrolyte filled between the positive pole part and the negative pole part, and a packaging portion for packaging the electrode portion and the electrolyte, the 3-D printing apparatus comprising:
    an ink output module comprising an ink supplier in which an ink for forming any one of the electrode portion, the electrolyte and the packaging portion is received and an ink discharger coupled to the ink supplier;
    a driving device configured to move the ink output module in X, Y, Z axis directions with respect to a substrate in which the supercapacitor or the secondary battery is to be formed, wherein the ink output module is mounted on the driving device;
    a dispenser connected to the ink supplier by a gas supply tube, for supplying gas having controlled pressure to the ink supplier through the gas supply tube and outputting the ink within the ink supplier through the ink discharger; and
    a controlling device configured to control the outputting of the ink by transmitting, to the dispenser and the driving device, a control command for fabricating the supercapacitor or the secondary battery,
    wherein the driving device comprises:
        a Z axis driving device configured to move the ink output module in a Z axis direction, wherein the ink output module is detachably mounted on the Z axis driving device;
        an X axis driving device configured to move in an X axis direction along a guide installed in a fixing table, and to be coupled to the Z axis driving device to move the Z axis driving device in the X axis direction; and
        a Y axis driving device installed in the fixing table to move a work base on which the substrate is placed in the Y axis direction from a side under the ink output module,
    wherein the positive pole part comprises a first current collector and a positive pole formed on the first current collector, and the negative pole part comprises a second current collector and a negative pole formed on the second current collector, and wherein the ink output module comprises:
- an ink output module for a current collector in which an ink for the current collector for forming the first current collector and the second current collector has been received;
- an ink output module for an electrode in which an ink for the electrode for forming the positive pole and the negative pole has been received;
- an ink output module for the electrolyte in which an ink for the electrolyte for forming the electrolyte has been received; and
- an ink output module for the packaging in which an ink for the packaging for forming the packaging portion has been received.

2. The 3-D printing apparatus of claim 1, wherein:
the ink discharger is detachably coupled to the ink supplier in such a way as to be replaced depending on a width of the outputting of the ink, and
the ink supplier has a structure to which the gas supply tube is detachably coupled.

3. The 3-D printing apparatus of claim 1, wherein the controlling device is configured to:
form a first layer of any one of the electrode portion, the electrolyte and the packaging portion,
raise the ink output module in a Z axis direction by controlling the driving device, and
adjust a height of the ink output module in the Z axis direction in order to form a second layer by outputting the ink again at a location raised up to a height of the first layer.

4. The 3-D printing apparatus of claim 1, wherein the dispenser supplies externally supplied gas to the ink supplier at given pressure, and
wherein the controlling device is configured to:
receive information on shapes of the positive pole part and the negative pole part of the supercapacitor,
generate the control command based on the information,
control the driving device in response to the control command, and
control a supply or a blocking of the gas for the ink supplier by the dispenser.

5. The 3-D printing apparatus of claim 1, wherein after the ink is supplied to the ink supplier, the ink discharger is coupled to the ink supplier by a screw or using a Luer lock method, the gas supply tube is connected to the ink supplier, and the ink output module is mounted on the driving device.

6. The 3-D printing apparatus of claim 4, wherein:
an inner diameter of the ink discharger is 20~600 μm, and
pressure of the gas supplied from the dispenser to the ink supplier is 20~800 kPa.

7. The 3-D printing apparatus of claim 4, wherein the dispenser comprises:
a gas supply pressure control panel enabling a user to input or adjust supply pressure of the gas; and
a situation display panel displaying information on at least one of the supply pressure of the gas, pressure within the ink supplier, and a discharge state of the ink.

8. The 3-D printing apparatus of claim 1, wherein:
an operating range of the X axis driving device and the Y axis driving device is 0~300 mm, and a moving speed thereof is 0.1~500 mm/s, and
an operating range of the Z axis driving device is 0~80 mm, and a moving speed thereof is 0.1~400 mm/s.

9. The 3-D printing apparatus of claim 1, wherein the ink for the electrode includes:
electrode materials including an electrode active material, a conductive agent and a binder;
a dispersing agent; and
a solvent,
wherein the electrode active material of 50~90 wt %, the conductive agent of 1~40 wt %, and the binder of 1~20 wt % with respect to a total weight of the electrode materials are mixed, and
wherein the dispersing agent of 0.1~10 wt % compared to the total weight of the electrode materials is added.

10. A three-dimensional (3-D) printing apparatus for fabricating a supercapacitor or a secondary battery comprising an electrode portion having a positive pole part and a negative pole part spaced apart from each other, an electrolyte filled between the positive pole part and the negative pole part, and a packaging portion for packaging the electrode portion and the electrolyte, the 3-D printing apparatus comprising:
an ink output module comprising an ink supplier in which an ink for forming any one of the electrode portion, the electrolyte and the packaging portion is received and an ink discharger coupled to the ink supplier;
a driving device configured to move the ink output module in X, Y, Z axis directions with respect to a substrate in which the supercapacitor or the secondary battery is to be formed, wherein the ink output module is mounted on the driving device;
a dispenser connected to the ink supplier by a gas supply tube, for supplying gas having controlled pressure to the ink supplier through the gas supply tube and outputting the ink within the ink supplier through the ink discharger; and
a controlling device configured to control the outputting of the ink by transmitting, to the dispenser and the driving device, a control command for fabricating the supercapacitor or the secondary battery,
wherein the driving device comprises:
a lower driving device configured to move a work base on which the substrate is placed in X and Y directions; and
a Z axis driving device configured to move the ink output module in a Z axis direction, wherein the ink output module is detachably mounted on the Z axis driving device,
wherein the positive pole part comprises a first current collector and a positive pole formed on the first current collector, and the negative pole part comprises a second current collector and a negative pole formed on the second current collector, and
wherein the ink output module comprises:
an ink output module for a current collector in which an ink for the current collector for forming the first current collector and the second current collector has been received;
an ink output module for an electrode in which an ink for the electrode for forming the positive pole and the negative pole has been received;
an ink output module for the electrolyte in which an ink for the electrolyte for forming the electrolyte has been received; and
an ink output module for the packaging in which an ink for the packaging for forming the packaging portion has been received.

11. The 3-D printing apparatus of claim 10, wherein:
the ink discharger is detachably coupled to the ink supplier in such a way as to be replaced depending on a width of the outputting of the ink, and
the ink supplier has a structure to which the gas supply tube is detachably coupled.

12. The 3-D printing apparatus of claim 10, wherein the lower driving device is installed in a fixing table, and
wherein the Z axis driving device moves in a Z axis direction along a guide installed in the fixing table.

13. The 3-D printing apparatus of claim 10, wherein the ink for the electrode includes:
electrode materials including an electrode active material, a conductive agent and a binder;
a dispersing agent; and
a solvent,
wherein the electrode active material of 50~90 wt %, the conductive agent of 1~40 wt %, and the binder of 1~20 wt % with respect to a total weight of the electrode materials are mixed, and
wherein the dispersing agent of 0.1~10 wt % compared to the total weight of the electrode materials is added.

14. A three-dimensional (3-D) printing apparatus for fabricating a supercapacitor or a secondary battery comprising an electrode portion having a positive pole part and a negative pole part spaced apart from each other, an electrolyte filled between the positive pole part and the negative pole part, and a packaging portion for packaging the electrode portion and the electrolyte, the 3-D printing apparatus comprising:
an ink output module comprising an ink supplier in which an ink for forming any one of the electrode portion, the electrolyte and the packaging portion is received and an ink discharger coupled to the ink supplier;
a driving device configured to move the ink output module in X, Y, Z axis directions with respect to a substrate in which the supercapacitor or the secondary battery is to be formed, wherein the ink output module is mounted on the driving device;
a dispenser connected to the ink supplier by a gas supply tube, for supplying gas having controlled pressure to the ink supplier through the gas supply tube and outputting the ink within the ink supplier through the ink discharger; and
a controlling device configured to control the outputting of the ink by transmitting, to the dispenser and the driving device, a control command for fabricating the supercapacitor or the secondary battery,
wherein the driving device comprises:
a table supporting a work base on which the substrate is placed;
a connection module on which the ink output module is detachably mounted; and
a transport module coupled to the connection module to move the connection module in the X, Y, Z axis directions,
wherein the positive pole part comprises a first current collector and a positive pole formed on the first current collector, and the negative pole part comprises a second current collector and a negative pole formed on the second current collector, and
wherein the ink output module comprises:
an ink output module for a current collector in which an ink for the current collector for forming the first current collector and the second current collector has been received;
an ink output module for an electrode in which an ink for the electrode for forming the positive pole and the negative pole has been received;
an ink output module for the electrolyte in which an ink for the electrolyte for forming the electrolyte has been received; and
an ink output module for the packaging in which an ink for the packaging for forming the packaging portion has been received.

15. The 3-D printing apparatus of claim 14, wherein:
the ink discharger is detachably coupled to the ink supplier in such a way as to be replaced depending on a width of the outputting of the ink, and
the ink supplier has a structure to which the gas supply tube is detachably coupled.

16. The 3-D printing apparatus of claim 14, wherein the connection module is a frame on which the ink output module is mounted and fixed, and
wherein the transport module is coupled to the connection module in such a way as to rotate.

17. The 3-D printing apparatus of claim 14, wherein the ink for the electrode includes:
electrode materials including an electrode active material, a conductive agent and a binder;
a dispersing agent; and
a solvent,
wherein the electrode active material of 50~90 wt %, the conductive agent of 1~40 wt %, and the binder of 1~20 wt % with respect to a total weight of the electrode materials are mixed, and
wherein the dispersing agent of 0.1~10 wt % compared to the total weight of the electrode materials is added.

\* \* \* \* \*